3,402,674
DISPLACEABLE BASE FOR ASSEMBLING A
MACHINE TOOL AND THE LIKE
Tamaki Tomita, 3 Kuribayashi, Modaiji-machi,
Okazaki-shi, Aichi-ken, Japan
Continuation-in-part of application Ser. No. 207,251,
July 3, 1962, and a division of application Ser. No.
331,308, Dec. 17, 1963, now Patent No. 3,299,498.
This application Sept. 20, 1966, Ser. No. 580,767
4 Claims. (Cl. 104—1)

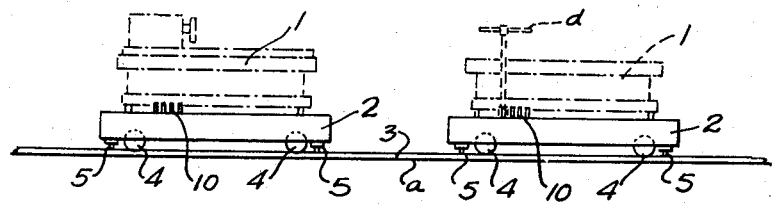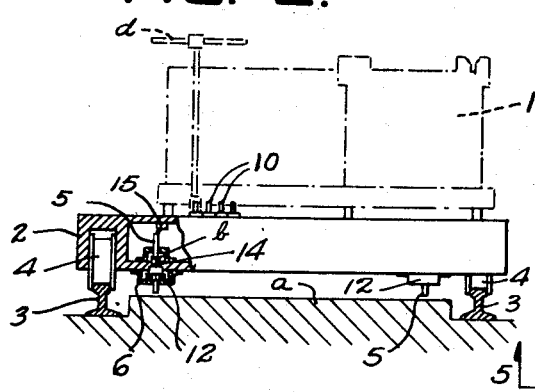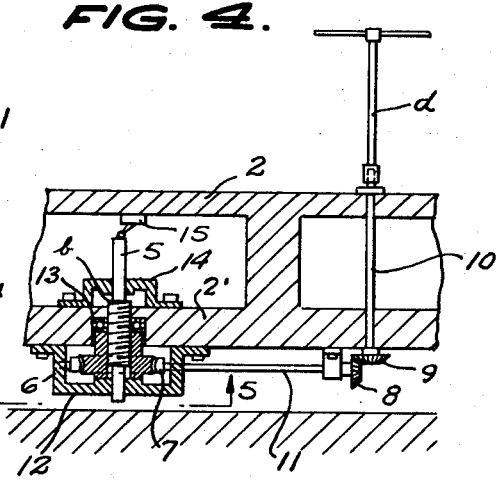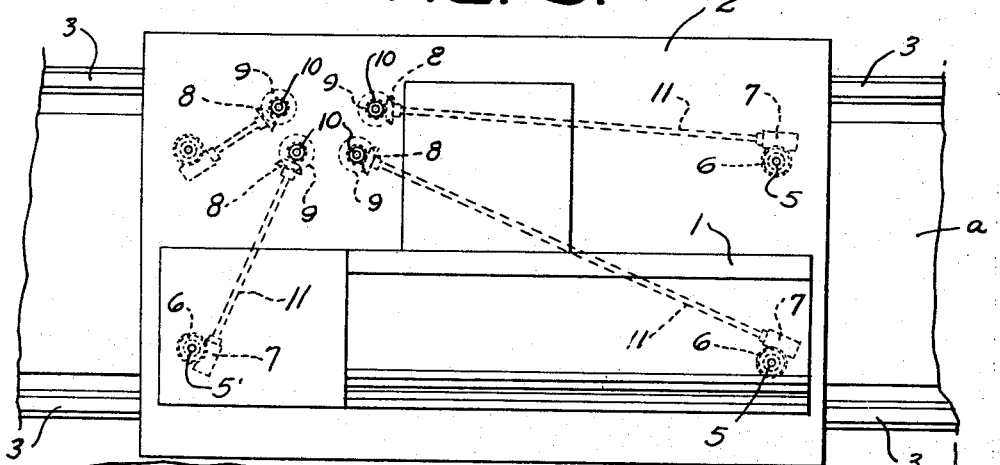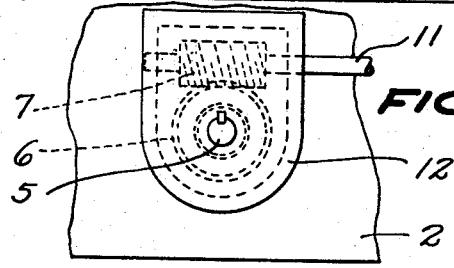

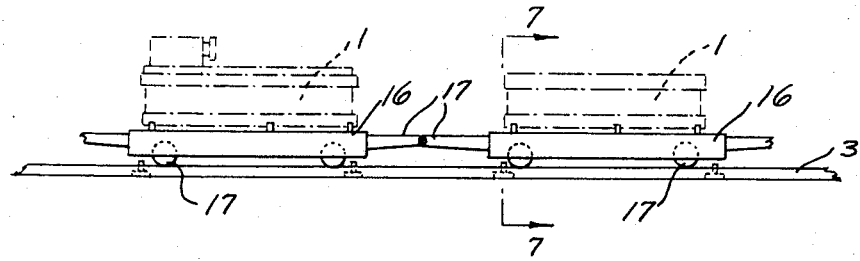
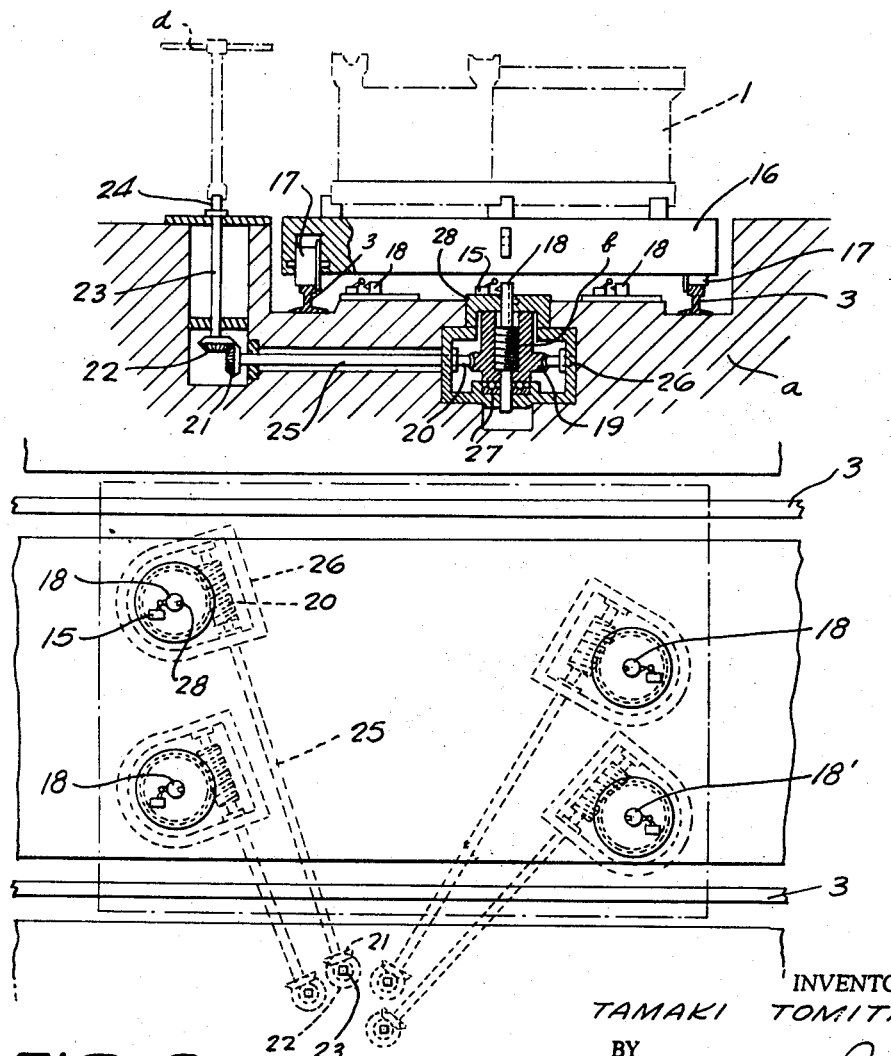

ABSTRACT OF THE DISCLOSURE

The present invention relates to a conveyor system for assemblying a machine tool having a track and a plurality of wheeled bases adapted to move on said track through a series of stations and which bases each have supporting bolts which can be individually raised and lowered for the purpose of raising, lowering or leveling each base relative to said track.

---

This application is an continuation-in-part of my co-pending application, Ser. No. 207,251, filed July 3, 1962, now abandoned, and a division from by pending application Ser. No. 331,308 filed Dec. 17, 1963, now Patent No. 3,299,498.

In the assembling of a machine tool and the like which require high precision, it is the general practice to use a level vial and an adjusting means such as a jack bolt on and against a floor surface so that the datum level of a bed of a machine tool is adjusted to be positioned horizontal and, after the adjustment, a head stock or the like is assembled to the bed. Now when the bed is moved onto another floor for the following station of assembly, it is necessary to make the datum level of the bed horizontal again due to the fact that these floors are not in parallel with each other. An appreciably long period such as several hours is wasted by even a skilled worker when making such level adjustment due to the fact that a bed is high, unevenly shaped and not absolutely rigid. Thus, it has been difficult to assemble a machine tool and the like by a conveyor system.

One object of this invention is to provide a conveyor system for use in the assembling of a machine tool and the like which require high precision, whereby a bed of such a machine tool is conveyed on a base and is very easily positioned horizontal whereby it is possible to assemble such a machine by a conveyor system.

The invention will be better understood and other objects and additional advantages of the invention will become apparent upon perusal of the following description given in connection with the drawings, and the scope of the invention will be defined in the appended claims.

In the drawings, FIG. 1 is a side view of conveyor system in which a base embodying this invention is used;

FIG. 2 is an enlarged fragmentary sectional front view of the conveyor system shown in FIG. 1;

FIG. 3 is a plan view of another base similar to that shown in FIG. 2;

FIG. 4 is a further enlarged vertical section showing the relation of a supporting means to a driving means therefor;

FIG. 5 is a bottom plan view taken along the line 5—5 of FIG. 4;

FIG. 6 is a schematic side elevation of two stations in an assembly system for assembling the machine tool in accordance with the present invention;

FIG. 7 is a cross-sectional view taken on line 7—7 of FIG. 6;

FIG. 8 is an enlarged plan view of a station;

Figure 9:
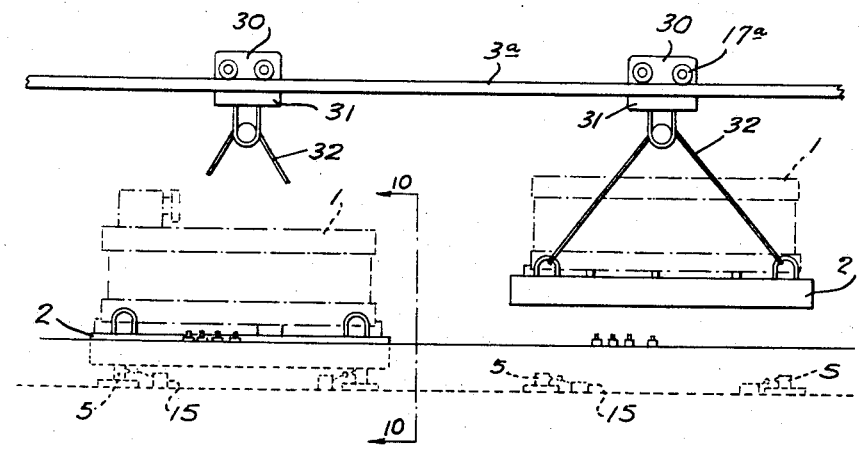
FIG. 9 is a side view of a further embodiment of the invention.

Referring more particularly to the drawings, the preferred embodiment of this invention will now be described; however, this description will be understood to be illustrative of the invention and not as limiting it to the particular construction shown and described. A bed 1 of a machine tool is set on a base 2 which is of a sufficient size and rigidity. There is a pair of conveyor rails 3 fixed on a floor $a$ supporting a plurality of said bases. The base 2 has wheels 4 adapted to run on the rails 3, and a bottom wall 2'. The bottom wall 2' is provided with three holes for the main supporting means and one hole for the stabilization means of base 2. Each hole is covered by an upper cover 14 and a bottom cover 12. The upper cover 14 is fixed on the upper surface of the bottom wall 2' and the bottom cover 12 is fixed on the bottom surface thereof. The two covers 12 and 14 are so arranged as to slidably support a leg 5 extending vertically therethrough. The leg 5 penetrates upwards and downwards beyond the two covers 14 and 12, respectively, and is keyed to cover 12 for being retained against rotation. A threaded portion $b$ is formed in the middle of the leg 5. A worm wheel 6 is threaded centrally so as to engage with the threaded portion $b$ of the leg 5. The worm wheel 6 is arranged between a thrust bearing 13 kept on the bottom surface of the bottom wall 2' and the upper surface of the bottom cover 12 and is rotatable with respect to them but not displaceable vertically so that the leg 5 may be moved vertically by rotating the worm wheel 6. Three of the four legs are main supporting legs 5 and one is a stabilizing leg 5' for stabilization of the base 2. The latter leg 5' is constituted similarly to the main supporting leg 5. According to circumstances, there may be provided more supporting legs 5' for stabilization. The three main supporting legs 5 are positioned so as to support the base 2 at three points. One or more stabilizing legs 5' is provided at the position for stabilizing the base 2 after the datum level thereof is made horizontal.

A horizontal shaft 11 is borne by the bottom cover 12 and the bottom wall 2' and has a worm 7 meshing with the worm wheel 6. The horizontal shaft 11 is extended to a convenient place on the bottom wall 2' of the base 2 where other horizontal shafts for other legs are also extended. A bevel gear 8 is fixed to the centralized end of the horizontal shaft 11. Another bevel gear 9 meshing with the bevel gear 8 is fixed on a vertical driving shaft 10 which penetrates upwards through the base 2 so as to provide a handle $d$ on the upper end of the driving shaft 10.

In operation, the handle $d$ is rotated so as to rotate the driving vertical shaft 10 normally, whereby the worm 7 is rotated from the vertical shaft 10 through the bevel gears 9 and 8 and the horizontal shaft 11. Then the worm wheel 6 meshing with the worm 7 is rotated. Since the worm wheel 6 does not move vertically, the leg 5 meshing with the worm wheel 6 is made to move vertically, or to descend. When the handle $d$ is rotated reversely, the leg 6 is made to ascend. Thus, the legs 5 can be lowered raising the base 2 above the rail 3.

For detecting whether the base 2 is set on the rails 2 or is in the course of assembly on the floor $a$, a limit switch 15 is provided above the upper end of the leg 5 within the base 2. It is to be understood that such a limit switch may signal the condition of the base electrically.

In accordance with this invention, a bed 1 of a machine tool is set on the base 2 which is made to run on the rails 3 to successive assembling stations. At each of the stations, the base 2 is stopped and raised by rotating the handle $d$. In this way, the bed 1 is leveled through base 2 by means of three point support. After the first station assembly has been finished, the base 2 is lowered by rotating each handle d so as to set the base 2 on the rails 3 again and make the base 2 run to the next assembling stations. Consequently, leveling can be made accurately and simply, and assembly on a conveyor system can be accurately and efficiently performed since centralized operation has become possible with this base.

Modifying this embodiment, the legs 5 may be moved vertically by a hydraulic or an electric means. In accordance with a further modification of this invention, it is possible to provide a set of supporting means in the floor a for substituting for the legs 5 provided in the base 2. In this case, the wheels 4 or a suitable displacing means only may be provided in the base 2. When such a base 2 has arrived at a station, the supporting means provided in the floor a of the station is raised so as to raise the base 2 and the limit switches 15 provided on the floor a may indicate the condition of the base 2.

Referring now to the modification shown in FIGS. 6–8, inclusive, a plurality of bases 16, each being of required size and rigidity, is provided for a bed 1 of a machine tool to be assembled. There are a plurality of stations, each for a fixing or subassembling operation of individual parts of the machine tool. The bases 16 are provided so as to correspond to the stations. Each base 16 has four wheels 17 to support and displace the base 16 on the rails 3 and suitable means for driving it. It is preferred to provide a suitable connecting means 17 for connecting the bases 16 with one another.

There are at least three supporting bolts 16 provided in the floor a within any one of the stations. It is necessary to arrange the supporting points at salient points of a polygon, of which the middle point comes almost under the center of gravity of the base 16 carrying the bed 1, whereby the base 16 is supported at three points. There is also illustrated a stabilizing bolt 18 which is provided for stabilizing a base 16. It is possible to provide more or less stabilizing bolts as the case may be, considering the stabilization of the base 16.

A casing 26 capped by a cover 28 is embedded in the floor a, so as to form a chamber, through which the supporting bolt 18 is extended. A worm wheel 19 has the supporting bolt 18 therein and a screw b is provided between them being fixedly connected to the bolt 18 and in threaded engagement with said worm wheel. A key 28 is provided for preventing the supporting bolt 18 from rotation, so that the supporting bolt 18 is moved vertically by rotating the worm wheel 19. The upper end of the worm wheel 19 is faced by the cover 28 and the lower end of the worm wheel 19 is supported by a thrust bearing 27 provided on the bottom of the casing 26. A worm 20 is mounted on a shaft 25 extended horizontally inside the floor a, and engages with the worm wheel 19 within the chamber. A bevel gear 21 is mounted on the extended end of the shaft 25 which is engaged with another bevel gear 22 fixedly mounted on the bottom end of a vertically arranged driving shaft. The top end 24 of the driving shaft 23 is extended upwards so as to be exposed above the floor a, and adapted to engage with a removable handle d. Each of the supporting bolts 18 and the stabilizing bolt 18′ is constituted similarly and the driving shafts 23 are centralized at a place where it is suitable to operate them while observing level vials mounted on the bed 1. There are limit switches 15 for bolts 18 and 18′ for indicating the motions of the bolts 18 and 18′ electrically, respectively.

In the operation of the device, a bed 1 of a machine tool or the like is set on a base 16. Several level vials are set on a top surface of the bed 1. The base 16 is brought to a station. A worker placed at the station operates the handle d so as to rotate the vertical shafts 23 in one direction, observing the level vials, whereby the base 16 is raised above the rails 3. Particularly, he rotates one vertical shaft 23 so as to raise a supporting bolt 18 until the top of the supporting bolt arrives at the bottom surface of the base 16 and further raise the same more, whereby a corresponding corner of the base 16 is raised above the rail 3. Next the worker rotates another vertical shaft by the handle d so as to raise another supporting bolt which is arranged near the longitudinally other end of the base 16, observing a level vial arranged along the length of the base 16. Thus, a lateral side of the base 16 is raised above the rail 3. Then still another supporting bolt is raised similarly, observing another level vial arranged along the breadth of the base 16, whereby the base 16 becomes supported at three points provided by the three supporting bolts, and it is very easy to keep the top surface of the base 16 horizontal in such a manner as above. If necessary, stabilizing bolts 18′ are provided and operated similarly, so that it becomes possible for the worker to ride on the base 16 to fix or subassemble a part of the machine tool on the bed 1. It is to be noted that the stabilizing bolt 18′ is not to be operated independently of the supporting bolts 18. When all bolts are in use, the situation is indicated to a foreman by the operation of the limit switches 15.

When the assembling operation at the station such as fixing or subassembling of a part of the machine tool is finished, the worker operates the handle d reversely rotating the handle d in the reverse direction so as to reset the base 16 on the rails 3. This reset is indicated to the foreman by the limit switches 15 so that he may control the movement of the bases 16 employed on the track upon confirmation that all bases are on the tracks 3. Then he may move these bases to the following stages of the assembling operation, respectively.

Figure 10:
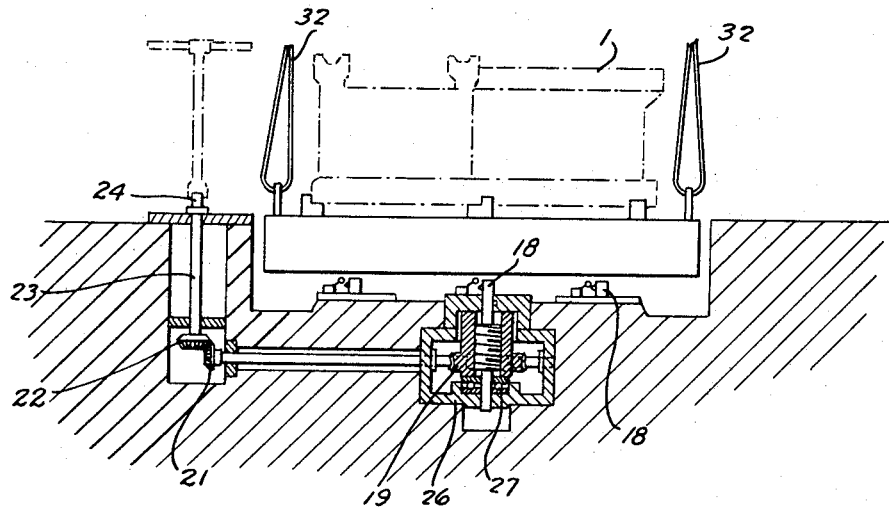
FIG. 10 is a sectional view taken on lines 10—10 of FIG. 9.

FIGS. 9 and 10 show another embodiment of this invention, where the rails 3a for displacing the bases 2 are secured by a ceiling so as to connect the assembling stations one after another. As many cranes 30 as the bases are provided along the rails 3a. That is, there is provided a crane belonging to any one of the stations. In addition, hoists 31 and ropes 32 are provided so as to raise, lower and displace the base 2. Each station for the subassembling or fixing operation is provided with supporting bolts and stabilizing bolts similarly to the preceding embodiment. After a base 2 has been set in the supporting bolts by means of the crane 30, the bed 1 is leveled similarly to the preceding embodiment. By virtue of the arrangement in accordance with this embodiment, when the base 2 is provided with rigidity and flatness as a bed plate, it is possible to make practically horizontal without any adjustment of the supporting bolts.

By virtue of this invention, the worker at a station may use merely a specialized tool for a finely divided single assembling operation. In addition, in accordance with this invention, the base is made horizontal within a few minutes so that it becomes possible to reduce the total assembling time down to two-thirds of that in accordance with the prior art.

While particular embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

I claim:

1. A conveyor system for assembling a machine tool and the like which comprises a track and a plurality of wheeled bases adapted to be moved on said track through a series of fixing stations, each of said stations having at least three supporting bolts, individual driving means for each of said bolts for raising and lowering said supporting bolts individually, said supporting bolts provided within each of said stations being adapted to support each of said bases when at said station so as to raise said base above said track and lower the same down again on said track, and driving shafts for said driving means within each of said stations being centralized.

2. A conveyor system for assembling a machine tool and the like which comprises a track and a plurality of wheeled bases adapted to be moved on said track through a series of fixing stations, each of said stations having at least three supporting bolts and at least one stabilizing bolt, an individual driving means for each of said bolts, an individual driving shaft for each of said driving means for raising and lowering said supporting bolts and stabilizing bolt individually, said supporting bolts provided within each of said stations being adapted to support each of said bases when at said station so as to raise said base above said track and lower the same again on said track, said stabilizing bolt provided within each of said stations being adapted to stabilize each of said bases supported above said track by said supporting bolts, and said driving shafts within each of said stations being centralized.

3. A conveyor system for assembling a machine tool and the like which comprises a track and a plurality of wheeled bases adapted to be moved along said track through a series of fixing stations, each of said stations comprising a crane and at least three supporting bolts, said crane being adapted to set said base on said supporting bolts and remove said base therefrom, individual driving means for said supporting bolts, an individual driving shaft for each of said driving means for raising and lowering said supporting bolts individually, said supporting bolts provided within each of said stations being adapted to support each of said bases when it is set thereon by said crane, and to level the same at that state, and said driving shafts within each of said stations being centralized.

4. A conveyor system for assembling a machine tool and the like comprising a fixed surface, a track mounted on said fixed surface, at least one base, wheels rotatably connected to said base and moveably mounted on said track, a plurality of bolts in threaded connection with said base, and positioned extending beneath said base for at times contacting said fixed surface and individual driving means for each of said bolts capable of raising and lowering said bolts relative to said base and contacting said fixed surface when lowered for raising, leveling and lowering said base from, relative to, and back onto said track as desired.

References Cited

UNITED STATES PATENTS

| | | | |
|---|---|---|---|
| 1,573,918 | 3/1926 | Dewhirst | 104—32 |
| 1,632,256 | 6/1927 | Walter | 104—32 |
| 1,682,066 | 8/1928 | Casey | 254—86 |

ARTHUR L. LA POINT, *Primary Examiner.*

D. F. WORTH, *Assisant Examiner.*